US012087481B2

(12) United States Patent
Xia et al.

(10) Patent No.: US 12,087,481 B2
(45) Date of Patent: Sep. 10, 2024

(54) AUXILIARY ALLOY CASTING PIECE, HIGH-REMANENCE AND HIGH-COERCIVE FORCE NDFEB PERMANENT MAGNET, AND PREPARATION METHODS THEREOF

(71) Applicant: Baotou Jinshan Magnetic Material Co., Ltd., Inner Mongolia (CN)

(72) Inventors: Feng Xia, Inner Mongolia (CN); Yulong Fu, Inner Mongolia (CN); Chen Chen, Inner Mongolia (CN); Hailong Zheng, Inner Mongolia (CN); Zichao Wang, Inner Mongolia (CN); Yonghong Liu, Inner Mongolia (CN); Caina Sun, Inner Mongolia (CN); Yu Wang, Inner Mongolia (CN)

(73) Assignee: Baotou Jinshan Magnetic Material Co., Ltd., Inner Mongolia (CN)

( * ) Notice: Subject to any disclaimer, the term of this patent is extended or adjusted under 35 U.S.C. 154(b) by 18 days.

(21) Appl. No.: 18/091,899

(22) Filed: Dec. 30, 2022

(65) Prior Publication Data

US 2024/0127993 A1 Apr. 18, 2024

(30) Foreign Application Priority Data

Oct. 13, 2022 (CN) ......................... 202211255156.5

(51) Int. Cl.

| | |
|---|---|
| ***B22F 9/02*** | (2006.01) |
| ***B22F 1/05*** | (2022.01) |
| ***B22F 3/16*** | (2006.01) |
| ***C22C 33/04*** | (2006.01) |
| ***C22C 38/00*** | (2006.01) |

(Continued)

(52) U.S. Cl.

CPC ................ *H01F 1/057* (2013.01); *B22F 1/05* (2022.01); *B22F 3/16* (2013.01); *B22F 9/023* (2013.01); *C22C 33/04* (2013.01); *C22C 38/002* (2013.01); *C22C 38/005* (2013.01); *C22C 38/06* (2013.01); *C22C 38/10* (2013.01); *C22C 38/12* (2013.01); *C22C 38/14* (2013.01); *H01F 41/0253* (2013.01); *B22F 2009/044* (2013.01); *B22F 2201/20* (2013.01); *B22F 2202/05* (2013.01); *B22F 2301/355* (2013.01);

(Continued)

(58) Field of Classification Search

CPC ..................................................... H01F 1/0577

See application file for complete search history.

(56) References Cited

FOREIGN PATENT DOCUMENTS

| | | |
|---|---|---|
| CN | 103426578 | * 12/2013 |
| CN | 204108260 | * 1/2015 |

(Continued)

*Primary Examiner* — Nicholas A Wang

(74) *Attorney, Agent, or Firm* — Meunier Carlin & Curfman LLC

(57) ABSTRACT

Provided are an auxiliary alloy casting piece, a high-remanence and high-coercive force NdFeB permanent magnet, and preparation methods thereof. The method for preparing the auxiliary alloy casting piece includes the following steps: providing an auxiliary alloy material including, by mass percentage, 40% to 45% of Pr, 1% to 2% of Co, 0.5% to 1% of Ga, 0.6% to 0.8% of B, 0.1% to 0.2% of V, 0.3% to 0.7% of Ti, and a balance of Fe; smelting the auxiliary alloy material to obtain a smelted material; and subjecting the smelted material to a quick-setting casting to obtain the auxiliary alloy casting piece; where the quick-setting casting includes a refining and a casting in sequence.

6 Claims, 1 Drawing Sheet

(51) Int. Cl.

| | |
|---|---|
| ***C22C 38/06*** | (2006.01) |
| ***C22C 38/10*** | (2006.01) |
| ***C22C 38/12*** | (2006.01) |
| ***C22C 38/14*** | (2006.01) |
| ***H01F 1/057*** | (2006.01) |
| ***H01F 41/02*** | (2006.01) |
| *B22F 9/04* | (2006.01) |

(52) U.S. Cl.
CPC ....... *B22F 2304/10* (2013.01); *B22F 2998/10* (2013.01); *C22C 2202/02* (2013.01)

(56) References Cited

FOREIGN PATENT DOCUMENTS

| | | | |
|---|---|---|---|
| CN | 104399995 | * | 3/2015 |
| CN | WO2021238783 | * | 12/2021 |
| GB | WO2012101398 | * | 8/2012 |
| JP | 0633581 | * | 1/1995 |
| JP | H08111308 | * | 4/1996 |

* cited by examiner

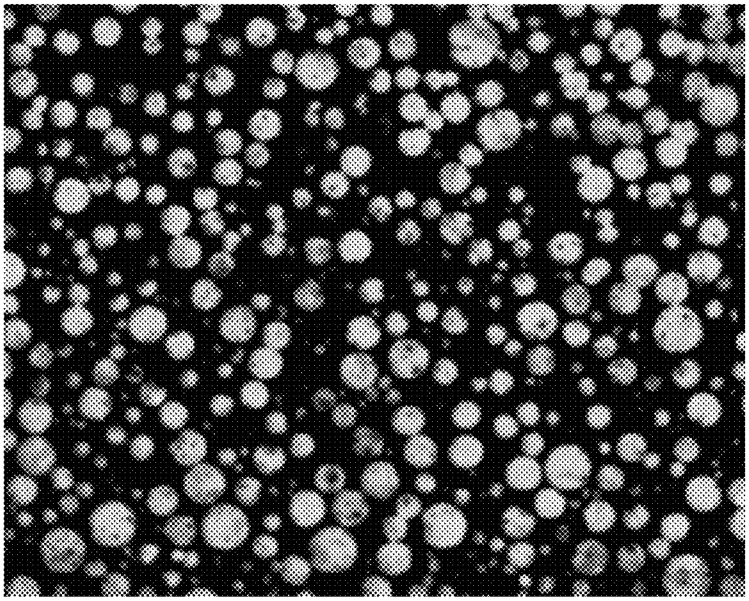

AUXILIARY ALLOY CASTING PIECE, HIGH-REMANENCE AND HIGH-COERCIVE FORCE NDFEB PERMANENT MAGNET, AND PREPARATION METHODS THEREOF

CROSS REFERENCE TO RELATED APPLICATION

This patent application claims the benefit and priority of Chinese Patent Application No. 202211255156.5, entitled "Auxiliary alloy casting piece, high-remanence and high-coercive force NdFeB permanent magnet, and preparation methods thereof" filed on Oct. 13, 2022, the disclosure of which is incorporated by reference herein in its entirety as part of the present application.

TECHNICAL FIELD

The present disclosure relates to the technical field of permanent magnets, in particular to an auxiliary alloy casting piece, a high-remanence and high-coercive force NdFeB permanent magnet, and preparation methods thereof.

BACKGROUND ART

High-performance sintered NdFeB permanent magnets play a key role in energy conversion in the new energy automobile industry, high-end consumer electronics, as well as the military industry. High-performance sintered NdFeB permanent magnets generally contain heavy rare earth elements dysprosium or terbium due to the fact that DyFeB and TbFeB have high anisotropy fields. However, the cost of heavy rare earth element dysprosium or terbium is several times that of praseodymium and neodymium metals, and the entire industrial chain is subject to high capital turnover pressure due to the high cost of raw materials. Therefore, there is an urgent need to develop a high-performance sintered NdFeB permanent magnet without heavy rare earth elements dysprosium or terbium.

Sintered NdFeB permanent magnets are prepared by double alloy process. The auxiliary alloy and the main alloy facilitate the regulation and control of a microstructure of the sintered NdFeB permanent magnet to a certain extent, so as to obtain products with an excellent performance. The key to the development of high-performance sintered NdFeB permanent magnets without heavy rare earth elements dysprosium and terbium lies in the regulation of the microstructure of the auxiliary alloy, but there are few related studies so far.

SUMMARY

An object of the present disclosure is to provide an auxiliary alloy casting piece, a high-remanence and high-coercive force NdFeB permanent magnet, and preparation methods thereof. The auxiliary alloy casting piece prepared by the method provided by the present disclosure is rich in spherical microstructures, and the auxiliary alloy casting piece can finally be used to prepare a high-performance sintered NdFeB permanent magnet without heavy rare earth elements dysprosium and terbium.

To achieve the above object of the present disclosure, the present disclosure provides the following technical solutions.

The present disclosure provides a method for preparing an auxiliary alloy casting piece, including the following steps:

- providing an auxiliary alloy material including, by mass percentage, 40% to 45% of Pr, 1% to 2% of Co, 0.5% to 1% of Ga, 0.6% to 0.8% of B, 0.1% to 0.2% of V, 0.3% to 0.7% of Ti, and a balance of Fe;
- smelting the auxiliary alloy material to obtain a smelted material; and
- subjecting the smelted material a quick-setting casting to obtain the auxiliary alloy casting piece; wherein the quick-setting casting comprises a refining, a casting and a cooling in sequence; the casting is conducted at a casting temperature of 1,330° C. to 1,380° C. at a copper roller rotational speed of 60 rpm to 80 rpm; and the cooling is conducted by argon-filled air cooling at a cooling rate of 7° C./min to 15° C./min.

In some embodiments, the smelting is conducted at a temperature of 1,390° C. to 1,430° C. for 3 min to 5 min; and the refining is conducted at a temperature of 1,460° C. to 1,510° C. for 2 min to 5 min.

In some embodiments, the method further includes: between the refining and the casting, cooling a refined material to a casting temperature at 3° C./min to 7° C./min and holding the casting temperature for 5 min to 9 min.

Also provided is an auxiliary alloy casting piece prepared by the above method, where the auxiliary alloy casting piece has a spherical microstructure with a diameter of 3 μm to 15 μm.

Also provided is a method for preparing a high-remanence and high-coercive force NdFeB permanent magnet, including the following steps:

- providing a main alloy casting piece including the following components by mass percentage: 28.5% to 29% of M, 1% to 2% of Co, 0.2% to 0.5% of Ga, 0.05% to 0.15% of Al, 0.9% to 0.92% of B, 0.05% to 0.15% of Ti, and a balance of Fe, where the M includes Pr and Nd; and
- subjecting the main alloy casting piece and the auxiliary alloy casting piece to a double-alloy hydrogen decrepitation, a jet milling, an orientation molding, a sintering, and a tempering in sequence, to obtain the high-remanence and high-coercive force NdFeB permanent magnet.

In some embodiments, the auxiliary alloy casting piece has a mass of 10% to 15% of the main alloy casting piece.

In some embodiments, the double-alloy hydrogen decrepitation includes a hydrogen absorption, a first dehydrogenation, and a second dehydrogenation in sequence.

In some embodiments, the hydrogen absorption is conducted at a temperature of 330° C. to 360° C. for 45 min to 60 min.

In some embodiments, the first dehydrogenation is conducted at a temperature of 435° C. to 465° C. for 2 h to 3 h.

In some embodiments, the second dehydrogenation is conducted at a temperature of 570° C. to 590° C. for 6 h to 8 h.

In some embodiments, the jet milling is conducted in the presence of a lubricant, where the lubricant has a mass of 1.5% c to 2% c of a coarse powder obtained by the hydrogen decrepitation. The jet milling is conducted at a pressure of 5.9 MPa to 6.1 MPa with a powder output speed of 130 kg/h to 160 kg/h. A fine powder obtained by the jet milling has a d50 of 2.5 μm to 3 μm and a particle size distribution d90/d10 of 3.47 to 3.8.

In some embodiments, the orientation molding is conducted at a magnetic induction intensity of 1.8 T to 2.3 T and a molding pressure of 3 MPa to 6 MPa to obtain a green body. The green body obtained by the orientation molding has a density of 4.1 g/cm$^3$ to 4.3 g/cm$^3$.

In some embodiments, the sintering includes a first sintering and a second sintering in sequence. The first sintering is conducted at a vacuum degree of less than $5\times10^{-2}$ Pa and a temperature of 1,020° C. to 1,050° C. for 2 h to 4 h. The second sintering is conducted at a vacuum degree of less than $5\times10^{-2}$ Pa and a temperature of 1,060° C. to 1,080° C. for 8 h to 10 h.

In some embodiments, the tempering includes a first tempering and a second tempering in sequence. The first tempering is conducted at a vacuum degree of less than 5 Pa and a temperature of 890° C. to 920° C. for 3 h to 5 h. The second tempering is conducted at a vacuum degree of less than 8 Pa and a temperature of 490° C. to 520° C. for 5 h to 7 h.

Also provided is a high-remanence and high-coercive force NdFeB permanent magnet prepared by the method as described above.

The present disclosure provides a method for preparing an auxiliary alloy casting piece, including the following steps: providing auxiliary alloy materials including, by mass percentage, 40% to 45% of Pr, 1% to 2% of Co, 0.5% to 1% of Ga, 0.6% to 0.8% of B, 0.1% to 0.2% of V, 0.3% to 0.7% of Ti, and a balance of Fe; smelting the auxiliary alloy materials to obtain a smelted material; and subjecting the smelted material a quick-setting casting to obtain the auxiliary alloy casting piece; wherein the quick-setting casting comprises a refining, a casting and a cooling in sequence; the casting is conducted at a casting temperature of 1,330° C. to 1,380° C. at a copper roller rotational speed of 60 rpm to 80 rpm; and the cooling is conducted by argon-filled air cooling at a cooling rate of 7° C./min to 10° C./min. In the present disclosure, titanium and vanadium are introduced into the auxiliary alloy casting piece, and a specific quick-setting casting process is combined, such that the auxiliary alloy casting piece is rich in spherical microstructures. A high-performance sintered NdFeB permanent magnet without heavy rare earth elements dysprosium and terbium can be finally prepared using the auxiliary alloy casting piece.

The present disclosure further provides a method for preparing a high-remanence and high-coercive force NdFeB permanent magnet, including the following steps: providing a main alloy casting piece including the following components by mass percentage: 28.5% to 29% of M, 1% to 2% of Co, 0.2% to 0.5% of Ga, 0.05% to 0.15% of Al, 0.9% to 0.92% of B, 0.05% to 0.15% of Ti, and a balance of Fe, where the M includes Pr and Nd; and subjecting the main alloy casting piece and the auxiliary alloy casting piece to a double-alloy hydrogen decrepitation, a jet milling, an orientation molding, a sintering, and a tempering in sequence, to obtain the high-remanence and high-coercive force NdFeB permanent magnet. In the present disclosure, titanium and vanadium are introduced into the auxiliary alloy, titanium is introduced into the main alloy, and the high-remanence and high-coercive force NdFeB permanent magnet is prepared in combination with a double alloy heat treatment process. Specifically, titanium is introduced into the main alloy and the auxiliary alloy to refine the grains during the process of sintering for preparing NdFeB; meanwhile, vanadium is introduced into the auxiliary alloy, combined with processes of sintering and tempering, which is beneficial to promote the precipitation of rare earth-rich phases along the grain boundaries of the main phase, and optimize the uniform distribution of rare earth-rich phases in the sintered NdFeB permanent magnet, thereby eventually obtaining a high-remanence and high-coercive force NdFeB permanent magnet without heavy rare earth elements dysprosium and terbium. Under the test conditions of the examples, the high-remanence and high-coercive force NdFeB permanent magnet has a remanence of 14.3 kGs and a coercive force of 17 kOe. In addition, on a basis of meeting the requirements of industrial application, the method also saves the scarce rare earth resources dysprosium and terbium, reduces the production cost of enterprises, and promotes the balanced utilization of rare earth resources. Moreover, the method is suitable for mass production, and can obtain a product with desirable stability.

BRIEF DESCRIPTION OF THE DRAWINGS

FIG. 1 shows a metallographic microscope observation FIGURE of an auxiliary alloy casting piece prepared in Example 1.

DETAILED DESCRIPTION OF THE EMBODIMENTS

The present disclosure provides a method for preparing an auxiliary alloy casting piece, including the following steps:

- providing an auxiliary alloy material including, by mass percentage, 40% to 45% of Pr, 1% to 2% of Co, 0.5% to 1% of Ga, 0.6% to 0.8% of B, 0.1% to 0.2% of V, 0.3% to 0.7% of Ti, and a balance of Fe;
- smelting the auxiliary alloy material to obtain a smelted material; and
- subjecting the smelted material a quick-setting casting to obtain the auxiliary alloy casting piece; wherein the quick-setting casting comprises a refining, a casting and a cooling in sequence; the casting is conducted at a casting temperature of 1,330° C. to 1,380° C. at a copper roller rotational speed of 60 rpm to 80 rpm; and the cooling is conducted by argon-filled air cooling at a cooling rate of 7° C./min to 15° C./min.

In the present invention, the auxiliary alloy material includes, by mass percentage, 40% to 45% of Pr, 1% to 2% of Co, 0.5% to 1% of Ga, 0.6% to 0.8% of B, 0.1% to 0.2% of V, 0.3% to 0.7% of Ti, and a balance of Fe. In some embodiments, the auxiliary alloy material includes, by mass percentage, 41% to 44% of Pr, 1.2% to 1.5% of Co, 0.5% to 0.8% of Ga, 0.6% to 0.7% of B, 0.15% to 0.18% of V, 0.3% to 0.5% of Ti, and a balance of Fe. In some embodiments, the auxiliary alloy material includes, by mass percentage, 43% of Pr, 1.5% of Co, 0.8% of Ga, 0.7% of B, 0.15% of V, 0.5% of Ti, and a balance of Fe. In some embodiments, the auxiliary alloy material includes, by mass percentage, 44% of Pr, 1.2% of Co, 1% of Ga, 0.8% of B, 0.15% of V, 0.7% of Ti, and a balance of Fe. In some embodiments, the auxiliary alloy material includes, by mass percentage, 41% of Pr, 1.2% of Co, 0.5% of Ga, 0.6% of B, 0.18% of V, 0.3% of Ti, and a balance of Fe.

In the present disclosure, the auxiliary alloy material is smelted to obtain a smelted material. In some embodiments, the smelting is conducted at a temperature of 1,390° C. to 1,430° C., preferably 1,400° C. to 1,405° C. In some embodiments, the smelting is conducted for 3 min to 5 min, preferably 3 min to 4 min.

In the present disclosure, the smelted material is subjected to a quick-setting casting to obtain the auxiliary alloy casting piece. The quick-setting casting includes a refining, a casting and a cooling in sequence. In some embodiments, the refining is conducted at a temperature of 1,460° C. to 1,510° C., preferably 1,470° C. to 1,480° C. In some embodiments, the refining is conducted for 2 min to 5 min, preferably 2 min to 3 min. The casting is conducted at a casting temperature of 1,330° C. to 1,380° C., preferably 1,340° C. to 1,360° C., more preferably 1,350° C. to 1,355° C. at a copper roller rotational speed of 60 rpm to 80 rpm, preferably 70 rpm. In some embodiments, the cooling is conducted by argon-filled air cooling at a cooling rate of 7° C./min to 15° C./min, preferably 10° C./min to 15° C./min. In some embodiments, the cooling by the argon-filled air cooling is conducted to less than 40° C. to obtain the auxiliary alloy casting piece. In some embodiments, the auxiliary alloy casting piece has a thickness of 0.15 mm to 0.25 mm.

In the present invention, the method further includes the following step between the refining and the casting: cooling a refined material to the casting temperature at 3° C./min to 7° C./min, preferably 5° C./min and holding the casting temperature for 5 min to 9 min, preferably 7 min. In some embodiments, the refined material is cooled to the casting temperature at the above rate and kept at the above time to obtain a material with uniform composition.

The present disclosure further provides an auxiliary alloy casting piece prepared by the method, where the auxiliary alloy casting piece has a spherical microstructure with a diameter of 3 μm to 15 μm.

The present disclosure further provides a method for preparing a high-remanence and high-coercive force NdFeB permanent magnet, including the following steps:

providing a main alloy casting piece including, by mass percentage, 28.5% to 29% of M, 1% to 2% of Co, 0.2% to 0.5% of Ga, 0.05% to 0.15% of Al, 0.9% to 0.92% of B, 0.05% to 0.15% of Ti, and a balance of Fe, where the M includes Pr and Nd; and subjecting the main alloy casting piece and the auxiliary alloy casting piece to a double-alloy hydrogen decrepitation, a jet milling, an orientation molding, a sintering, and a tempering in sequence, to obtain the high-remanence and high-coercive force NdFeB permanent magnet.

In the present disclosure, a main alloy casting piece is provided, which includes the following components by mass percentage: 28.5% to 29% of M, 1% to 2% of Co, 0.2% to 0.5% of Ga, 0.05% to 0.15% of Al, 0.9% to 0.92% of B, 0.05% to 0.15% of Ti, and a balance of Fe. In some embodiments, the main alloy casting piece is provided, which includes the following components by mass percentage: 28.5% to 28.8% of M, 1.5% to 1.8% of Co, 0.3% to 0.35% of Ga, 0.08% to 0.1% of Al, 0.9% to 0.91% of B, 0.01% to 0.12% of Ti, and a balance of Fe. In some embodiments, the main alloy casting piece is provided, which includes the following components by mass percentage: 28.8% of M, 1.5% of Co, 0.35% of Ga, 0.1% of Al, 0.9% of B, 0.1% of Ti, and a balance of Fe. In some embodiments, the main alloy casting piece is provided, which includes the following components by mass percentage: 28.5% of M, 1.8% of Co, 0.35% of Ga, 0.1% of Al, 0.9% of B, 0.12% of Ti, and a balance of Fe. In some embodiments, the main alloy casting piece is provided, which includes the following components by mass percentage: 29% of M, 1.5% of Co, 0.3% of Ga, 0.1% of Al, 0.9% of B, 0.15% of Ti, and a balance of Fe. The M includes Pr and Nd. In some embodiments, in the M, Pr and Nd have a mass ratio of (4-7):(21.8-24.8), preferably (5-6):(22.5-23.5), and more preferably 5.7:23.1, 5.8:23, 5.7:22.8, or 5.9:23.1. In some embodiments, the quick-setting casting is conducted after providing the raw material according to the components of the main alloy casting piece to obtain the main alloy casting piece. In some embodiments, the quick-setting casting is conducted under a refining temperature of 1,460° C. to 1,490° C., preferably 1,470° C. to 1,480° C. In some embodiments, the quick-setting casting is conducted at a casting temperature of 1,390° C. to 1,420° C., preferably 1,405° C. to 1,420° C. and a copper roller rotational speed of 40 rpm to 45 rpm, preferably 41 rpm to 43 rpm. In some embodiments, the quick-setting casting is conducted at a cooling rate of 7° C./min to 10° C./min by argon-filled air cooling, preferably 8° C./min to 9° C./min.

In the present disclosure, the main alloy casting piece and the auxiliary alloy casting piece are subjected to a double-alloy hydrogen decrepitation, a jet milling, an orientation molding, a sintering, and a tempering in sequence, to obtain the high-remanence and high-coercive force NdFeB permanent magnet. In some embodiments, the auxiliary alloy casting piece has a mass of 10% to 15%, preferably 10% to 12% of the main alloy casting piece. Each step will be described in detail below.

In the present disclosure, the main alloy casting piece and the auxiliary alloy casting piece are subjected to the double-alloy hydrogen decrepitation to obtain a coarse powder. In some embodiments, the double-alloy hydrogen decrepitation includes a hydrogen absorption, a first dehydrogenation, and a second dehydrogenation in sequence. In some embodiments, the hydrogen absorption is conducted at a temperature of 330° C. to 360° C., preferably 350° C. to 360° C. In some embodiments, the hydrogen absorption is conducted for 45 min to 60 min, preferably 55 min to 60 min. In some embodiments, the first dehydrogenation is conducted at a temperature of 435° C. to 465° C., preferably 450° C. to 460° C. In some embodiments, the first dehydrogenation is conducted for 2 h to 3 h, preferably 2.5 h. In some embodiments, the second dehydrogenation is conducted at a temperature of 570° C. to 590° C., preferably 580° C. In some embodiments, the second dehydrogenation is conducted for 6 h to 8 h, preferably 7 h. In some embodiments, the material obtained by the second dehydrogenation is cooled to 380° C. to 420° C. at 3° C./min to 7° C./min, held for 25 min to 35 min, and then subjected to argon-filled cooling at 15° C./min to 25° C./min to a room temperature, to obtain the coarse powder. In some embodiments, the material obtained by the second dehydrogenation is cooled to 400° C. at 5° C./min, held for 30 min, and then subjected to argon-filled cooling at 20° C./min to a room temperature, to obtain the coarse powder. In some embodiments, the coarse powder has an average particle size of 50 μm to 100 μm, preferably 80 μm. In some embodiments, the double-alloy hydrogen decrepitation is conducted in a hydrogen decrepitation furnace.

In the present invention, the coarse powder is subjected to a jet milling to obtain a fine powder. In some embodiments, the jet milling is conducted in the presence of a lubricant. In some embodiments, the lubricant is a grease lubricant. In some embodiments, the lubricant has a mass of 1.5% c to 2% c, preferably 1.8% c to 2% c of the coarse powder. In some embodiments, the coarse powder and the lubricant are mixed by stirring for 1.5 h to 2.5 h, preferably 2 h, and then subjected to a jet milling. There is no need to add an additional antioxidant to the jet milling. In some embodiments, the jet milling is conducted at a pressure of 5.9 MPa to 6.1 MPa, preferably 6 MPa with a powder output speed of preferably 130 kg/h to 160 kg/h, more preferably 138 kg/h to 159 kg/h, and further more preferably 145 kg/h to 150 kg/h. In some embodiments, the fine powder obtained by the jet milling has a d50 of 2.5 μm to 3 μm, preferably 2.58 μm to 2.75 μm, and more preferably 2.63 μm to 2.68 μm. In some embodiments, the fine powder obtained by the jet milling has a particle size distribution d90/d10 of 3.47 to 3.8, preferably 3.65 to 3.71.

In the present disclosure, the fine powder is subjected to an orientation molding to obtain a green body. In some embodiments, the orientation molding is conducted at a magnetic induction intensity of 1.8 T to 2.3 T, preferably 2.12 T to 2.2 T. In some embodiments, the orientation molding is conducted at a molding pressure of 3 MPa to 6 MPa, preferably 3.5 MPa to 5 MPa, and more preferably 4 MPa to 4.5 MPa. In some embodiments, the green body has a density of 4.1 g/cm$^3$ to 4.3 g/cm$^3$, preferably 4.2 g/cm$^3$ to 4.25 g/cm$^3$, and more preferably 4.21 g/cm$^3$ to 4.22 g/cm$^3$. In some embodiments, the orientation molding is conducted in a magnetic field press.

In the present disclosure, the green body is sintered to obtain a sintered material. In some embodiments, the lubricant in the green body is removed before the sintering. In some embodiments, the lubricant is removed by heating the green body to fully volatilize the lubricant. In some embodiments, the heating is conducted at a temperature of 530° C. to 600° C., preferably 570° C. In some embodiments, the heating is conducted for 3 h to 5 h, preferably 4 h. In some embodiments, the sintering includes a first sintering and a second sintering in sequence. In some embodiments, the first sintering is conducted at a vacuum degree of less than $5\times10^{-2}$ Pa, preferably $5\times10^{-3}$ Pa. In some embodiments, the first sintering is conducted at a temperature of 1,020° C. to 1,050° C., preferably 1,030° C. In some embodiments, the first sintering is conducted for 2 h to 4 h, preferably 2 h. In some embodiments, a temperature required for the heating is raised to a temperature required for the first sintering for 5 h to 8 h, preferably 6 h by preferably a uniform temperature rise. In some embodiments, after the first sintering, the temperature required for the first sintering is raised to a temperature required for the second sintering for 20 min to 40 min, preferably 30 min by preferably a uniform temperature rise. In some embodiments, the second sintering is conducted at a vacuum degree of less than $5\times10^{-2}$ Pa, preferably $5\times10^{-3}$ Pa. In some embodiments, the second sintering is conducted at a temperature of 1,060° C. to 1,080° C., preferably 1,065° C. to 1,070° C. In some embodiments, the second sintering is conducted for 8 h to 10 h, preferably 8 h.

In the present disclosure, the sintered material is subjected to tempering to obtain the high-remanence and high-coercive force NdFeB permanent magnet. In some embodiments, the tempering includes a first tempering and a second tempering in sequence. In some embodiments, the first tempering is conducted at a vacuum degree of less than 5 Pa, preferably 3 Pa. In some embodiments, the first tempering is conducted at a temperature of 890° C. to 920° C., preferably 900° C. to 910° C. In some embodiments, the first tempering is conducted for 3 h to 5 h, preferably 4 h. In some embodiments, a temperature required for the second sintering is cooled to a temperature required for the first tempering by argon-filled air cooling, followed by the first tempering. In some embodiments, after the first tempering, a product is cooled to 80° C. to 120° C., preferably 100° C., by argon-filled air cooling, and then heated to a temperature required for the second tempering for preferably 3 h to 5 h, more preferably 3.5 h by preferably a uniform temperature rise. In some embodiments, the second tempering is conducted at a vacuum degree of less than 8 Pa, preferably 3 Pa. In some embodiments, the second tempering is conducted at a temperature of 490° C. to 520° C., preferably 500° C. to 510° C. In some embodiments, the second tempering is conducted for 5 h to 8 h, preferably 6 h. In some embodiments, after the second tempering, a resulting product is cooled to less than 40° C. by argon-filled air cooling to obtain the high-remanence and high-coercive force NdFeB permanent magnet.

Also provided is a high-remanence and high-coercive force NdFeB permanent magnet prepared by the method above.

The technical solutions of the present disclosure will be described below clearly and completely in conjunction with the examples of the present disclosure. Apparently, the described examples are only a part of, not all of, the examples of the present disclosure. All other examples obtained by those skilled in the art based on the examples of the present disclosure without creative efforts shall fall within the protection scope of the present disclosure.

Example 1

According to a formula design, an auxiliary alloy material composed of the following components was provided: by mass percentage, Pr 43%, Co 1.5%, Ga 0.8%, B 0.7%, V 0.15%, Ti 0.5%, and a balance of Fe. The auxiliary alloy material was smelted at 1,400° C. for 3 min, heated to 1,480° C. at 10° C./min to conduct a refining for 2 min, cooled down to 1,350° C. at 5° C./min and held for 7 min, and then subjected to a casting at a copper roller rotational speed of 70 rpm, and cooled by argon-filled air cooling (at 15° C./min) to less than 40° C., so as to obtain an auxiliary alloy casting piece with a thickness of 0.15 mm to 0.25 mm.

According to a formula design, a main alloy raw material composed of the following components was provided: by mass percentage, Pr and Nd 28.8% (Pr and Nd at a mass ratio of 5.8:23), Co 1.5%, Ga 0.35%, Al 0.1%, B 0.9%, Ti 0.1%, and a balance of Fe. The main alloy raw material was subjected to a quick-setting casting to obtain a main alloy casting piece; where the quick-setting casting was conducted at a refining temperature of 1,470° C., a casting temperature of 1,405° C., and a copper roller rotational speed of 43 rpm, and cooled by argon-filled air cooling at 9° C./min.

The main alloy casting piece and the auxiliary alloy casting piece were placed in a hydrogen decrepitation furnace, where the auxiliary alloy casting piece had a mass of 10% of the main alloy casting piece. The main alloy casting piece and the auxiliary alloy casting piece were subjected to a double-alloy hydrogen decrepitation, specifically, the main alloy casting piece and the auxiliary alloy casting piece were subjected to a hydrogen absorption at 350° C. for 60 min, a first dehydrogenation at 450° C. for 2.5 h, a second dehydrogenation at 580° C. for 7 h, and then cooled at 5° C./min to 400° C. and held for 30 min, and then cooled to a room temperature (25° C.) at 20° C./min by argon-filled air cooling, so as to obtain a coarse powder with an average particle size of 80 μm.

The coarse powder was mixed by stirring with a grease lubricant for 2 h, where the grease lubricant was 1.8% c of a mass of the coarse powder. An obtained mixed material (without additional antioxidants) was subjected to a jet-milling to obtain a fine powder. The jet milling was conducted at 6 MPa, with a powder output speed of 150 kg/h. The fine powder had a d50 of 2.68 μm and a particle size distribution d90/d10 of 3.65.

The fine powder was placed in a magnetic field press, and subjected to an orientation molding at a magnetic induction intensity of 2 T and a molding pressure of 4 MPa to obtain a green body with a density of 4.2 g/cm$^3$.

The green body was kept at 570° C. for 4 h to fully volatilize the grease lubricant, then the green body was subjected to a first sintering under a vacuum degree of $5\times10^{-3}$ Pa and a temperature of 1,030° C. for 2 h, where the temperature is raised at a constant speed for 6 h. A product was heated at a constant speed for 30 min to 1,060° C. and subjected to a second sintering for 8 h to obtain a sintered material. The sintered material was subjected to argon-filled air cooling to 910° C., and then held to conduct a first tempering for 4 h. A resulting product was subjected to argon-filled air cooling to 100° C., heated at a constant speed for 3.5 h to 510° C., and held to conduct a second tempering for 6 h under a vacuum degree of 3 Pa. A resulting product was subjected to argon-filled air cooling to 40° C. under a vacuum degree of 3 Pa, to obtain a high-remanence and high-coercive force NdFeB permanent magnet.

FIG. 1 shows a metallographic microscope observation FIGURE of the auxiliary alloy casting piece prepared in Example 1. The results show that under the metallographic microscope, it is observed that the auxiliary alloy casting piece prepared in Example 1 is rich in spherical microstructures with a diameter of 3 μm to 15 μm. The auxiliary alloy casting piece is rich in Pr, Fe, Ga, V, and a small amount of B elements observed by scanning electron microscope.

Three high-remanence and high-coercive force NdFeB permanent magnet samples were repeatedly prepared according to the method of Example 1, and then tested at 20° C. on a φ10×10 cylinder. Specifically, the remanence (Br), magnetic induction coercive force (Hcb), intrinsic coercive force (Hcj), magnetic energy product ((BH)max), reverse magnetic field when J=0.9 Jr on a J demagnetization curve of the magnet (Hk), and squareness (Hk/Hcj) were measured. The specific results are shown in Table 1. It can be seen from Table 1 that after testing, the high-remanence and high-coercive force NdFeB permanent magnet sample prepared by the method provided by the present disclosure has a remanence of 14.3 kGs and an intrinsic coercive force of 17 kOe. Moreover, Table 1 shows that the high-remanence and high-coercive force NdFeB permanent magnet had desirable stability.

Table 1 Performance test results of three high-remanence and high-coercive force NdFeB permanent magnet samples in Example 1

| Sample ID | Br (kGs) | Hcb (kOe) | Hcj (kOe) | (BH)max (MGOe) | Hk (kOe) | Hk/Hcj | Temp (° C.) |
|---|---|---|---|---|---|---|---|
| Sample 1 | 14.35 | 14.06 | 17.16 | 49.32 | 17.02 | 0.995 | 20 |
| Sample 2 | 14.32 | 14.05 | 17.22 | 49.35 | 16.72 | 0.962 | 20 |
| Sample 3 | 14.30 | 14.03 | 17.10 | 49.32 | 16.90 | 0.987 | 20 |

Example 2

According to a formula design, an auxiliary alloy material composed of the following components was provided, by mass percentage, Pr 44%, Co 1.2%, Ga 1%, B 0.8%, V 0.15%, Ti 0.7%, and a balance of Fe. The auxiliary alloy material was smelted at 1,405° C. for 3 min, heated to 1,480° C. at 10° C./min to conduct a refining for 2 min, cooled down to 1,355° C. at 5° C./min and held for 7 min, and then subjected to a casting at a copper roller rotational speed of 70 rpm, and cooled by argon-filled air cooling (at 15° C./min) to less than 40° C., so as to obtain an auxiliary alloy casting piece with a thickness of 0.15 mm to 0.25 mm.

According to a formula design, a main alloy raw material composed of the following components was provided: by mass percentage, Pr and Nd 28.5% (Pr and Nd at a mass ratio of 5.7:22.8), Co 1.8%, Ga 0.35%, Al 0.1%, B 0.9%, Ti 0.12%, and a balance of Fe. The main alloy raw material was subjected to a quick-setting casting to obtain a main alloy casting piece; where the quick-setting casting was conducted at a refining temperature of 1,470° C., a casting temperature of 1,405° C., and a copper roller rotational speed of 43 rpm, and cooled by argon-filled air cooling at 9° C./min.

The main alloy casting piece and the auxiliary alloy casting piece were placed in a hydrogen decrepitation furnace, where the auxiliary alloy casting piece had a mass of 10% of the main alloy casting piece. The main alloy casting piece and the auxiliary alloy casting piece were subjected to a double-alloy hydrogen decrepitation, specifically, the main alloy casting piece and the auxiliary alloy casting piece were subjected to a hydrogen absorption at 360° C. for 60 min, a first dehydrogenation at 460° C. for 2.5 h, a second dehydrogenation at 580° C. for 7 h, and then cooled at 5° C./min to 400° C. and held for 30 min, and then cooled to a room temperature (25° C.) at 20° C./min by argon-filled air cooling, so as to obtain a coarse powder with an average particle size of 80 μm.

The coarse powder was mixed by stirring with a grease lubricant for 2 h, where the grease lubricant was 2% c of a mass of the coarse powder. An obtained mixed material (without additional antioxidants) was subjected to a jet-milling to obtain a fine powder. The jet milling was conducted at 6 MPa, with a powder output speed of 159 kg/h. The fine powder had a d50 of 2.75 μm and a particle size distribution d90/d10 of 3.71.

The fine powder was placed in a magnetic field press, and subjected to an orientation molding at a magnetic induction intensity of 2.1 T and a molding pressure of 5 MPa to obtain a green body with a density of 4.21 g/cm$^3$.

The green body was kept at 570° C. for 4 h to fully volatilize the grease lubricant, then the green body was subjected to a first sintering under a vacuum degree of $5\times10^{-3}$ Pa and a temperature of 1,030° C. for 2 h, where temperature is raised at a constant speed for 6 h. A product was heated at a constant speed for 30 min to 1,075° C. and subjected to a second sintering for 8 h to obtain a sintered material. The sintered material was subjected to argon-filled air cooling to 890° C., and then held to conduct a first tempering for 4 h under a vacuum degree of 3 Pa. A resulting product was subjected to argon-filled air cooling to 100° C., heated at a constant speed for 3.5 h to 520° C., and held to conduct a second tempering for 6 h under a vacuum degree of 3 Pa. A resulting product was subjected to argon-filled air cooling to 40° C. under a vacuum degree of 3 Pa, to obtain a high-remanence and high-coercive force NdFeB permanent magnet.

Three high-remanence and high-coercive force NdFeB permanent magnet samples were repeatedly prepared according to the method of Example 2, and then tested at 20° C. on a φ10×10 cylinder. Specifically, the remanence (Br), magnetic induction coercive force (Hcb), intrinsic coercive force (Hcj), magnetic energy product ((BH)max), reverse magnetic field when J=0.9 Jr on a J demagnetization curve of the magnet (Hk), and squareness (Hk/Hcj) were measured. The specific results are shown in Table 2. It can be seen from Table 2 that after testing, the high-remanence and high-coercive force NdFeB permanent magnet sample prepared by the method provided by the present disclosure has a remanence of 14.3 kGs and an intrinsic coercive force of 17 kOe. Moreover, Table 2 shows that the high-remanence and high-coercive force NdFeB permanent magnet had desirable stability.

Table 2 Performance test results of three high-remanence and high-coercive force NdFeB permanent magnet samples in Example 2

| Sample ID | Br (kGs) | Hcb (kOe) | Hcj (kOe) | (BH)max (MGOe) | Hk (kOe) | Hk/Hcj | Temp (° C.) |
|---|---|---|---|---|---|---|---|
| Sample 1 | 14.38 | 14.09 | 17.13 | 49.47 | 16.75 | 0.977 | 20 |
| Sample 2 | 14.39 | 14.11 | 17.07 | 49.51 | 16.61 | 0.973 | 20 |
| Sample 3 | 14.36 | 14.08 | 17.21 | 49.41 | 16.90 | 0.982 | 20 |

Example 3

According to a formula design, an auxiliary alloy material composed of the following components was provided: by mass percentage, Pr 41%, Co 1.2%, Ga 0.5%, B 0.6%, V 0.18%, Ti 0.3%, and a balance of Fe. The auxiliary alloy material was smelted at 1,390° C. for 3 min, heated to 1,470° C. at 10° C./min to conduct a refining for 2 min, cooled down to 1,340° C. at 5° C./min and held for 7 min, and then subjected to a casting at a copper roller rotational speed of 70 rpm, and cooled by argon-filled air cooling (at 15° C./min) to less than 40° C., so as to obtain an auxiliary alloy casting piece with a thickness of 0.15 mm to 0.25 mm.

According to a formula design, a main alloy raw material composed of the following components was provided: by mass percentage, Pr and Nd 29% (Pr and Nd at a mass ratio of 5.9:23.1), Co 1.5%, Ga 0.3%, Al 0.1%, B 0.9%, Ti 0.15%, and a balance of Fe. The main alloy raw material was subjected to a quick-setting casting to obtain a main alloy casting piece; where the quick-setting casting was conducted at a refining temperature of 1480° C., a casting temperature of 1420° C., and a copper roller rotational speed of 43 rpm, and cooled by argon-filled air cooling at 9° C./min.

The main alloy casting piece and the auxiliary alloy casting piece were placed in a hydrogen decrepitation furnace, where the auxiliary alloy casting piece had a mass of 10% of the main alloy casting piece. The main alloy casting piece and the auxiliary alloy casting piece were subjected to a double-alloy hydrogen decrepitation, specifically, the main alloy casting piece and the auxiliary alloy casting piece were subjected to a hydrogen absorption at 350° C. for 60 min, a first dehydrogenation at 450° C. for 2.5 h, and a second dehydrogenation at 580° C. for 7 h, and then cooled at 5° C./min to 400° C. and held for 30 min, and then cooled to a room temperature (25° C.) by argon-filled air cooling, so as to obtain a coarse powder with an average particle size of 80 μm.

The coarse powder was mixed by stirring with a grease lubricant for 2 h, where the grease lubricant was 1.8% c of a mass of the coarse powder. An obtained mixed material (without additional antioxidants) was subjected to a jet-milling to obtain a fine powder. The jet milling was conducted at 6 MPa, with a powder output speed of 138 kg/h. The fine powder had a d50 of 2.58 μm and a particle size distribution d90/d10 of 3.47.

The fine powder was placed in a magnetic field press, and subjected to an orientation molding at a magnetic induction intensity of 2.2 T and a molding pressure of 3.5 MPa to obtain a green body with a density of 4.22 g/cm$^3$.

The green body was kept at 570° C. for 4 h to fully volatilize the grease lubricant, and then the green body was subjected to a first sintering under a vacuum degree of $5\times10^{-3}$ Pa and a temperature of 1,030° C. for 2 h, where the temperature is raised at a constant speed for 6 h. A product was heated at a constant speed for 30 min to 1,060° C. and subjected to a second sintering for 8 h to obtain a sintered material. The sintered material was subjected to argon-filled air cooling to 900° C., and then held to conduct a first tempering for 4 h under a vacuum degree of 3 Pa. A resulting product was subjected to argon-filled air cooling to 100° C., heated at a constant speed for 3.5 h to 500° C., and held to conduct a second tempering for 6 h under a vacuum degree of 3 Pa. A resulting product was subjected to argon-filled air cooling to 40° C. under a vacuum degree of 3 Pa, to obtain a high-remanence and high-coercive force NdFeB permanent magnet.

Three high-remanence and high-coercive force NdFeB permanent magnet samples were repeatedly prepared according to the method of Example 3, and then tested at 20° C. on a φ10×10 cylinder. Specifically, the remanence (Br), magnetic induction coercive force (Hcb), intrinsic coercive force (Hcj), magnetic energy product ((BH)max), reverse magnetic field when J=0.9 Jr on a J demagnetization curve of the magnet (Hk), and squareness (Hk/Hcj) were measured. The specific results are shown in Table 3. It can be seen from Table 3 that after testing, the high-remanence and high-coercive force NdFeB permanent magnet sample prepared by the method provided by the present disclosure has a remanence of 14.3 kGs and an intrinsic coercive force of 17 kOe. Moreover, Table 3 shows that the high-remanence and high-coercive force NdFeB permanent magnet had desirable stability.

Table 3 Performance test results of three high-remanence and high-coercive force NdFeB permanent magnet samples in Example 3

| Sample ID | Br (kGs) | Hcb (kOe) | Hcj (kOe) | (BH)max (MGOe) | Hk (kOe) | Hk/Hcj | Temp (° C.) |
|---|---|---|---|---|---|---|---|
| Sample 1 | 14.30 | 13.88 | 17.08 | 49.15 | 16.77 | 0.982 | 20 |
| Sample 2 | 14.31 | 13.89 | 17.13 | 49.21 | 16.84 | 0.983 | 20 |
| Sample 3 | 14.30 | 13.89 | 17.12 | 49.17 | 16.76 | 0.979 | 20 |

The above descriptions are merely preferred implementations of the present disclosure. It should be noted that those skilled in the art may further make several improvements and modifications without departing from the principle of the present disclosure, but such improvements and modifications should be deemed as falling within the protection scope of the present disclosure.

What is claimed is:

1. A method for preparing an NdFeB permanent magnet, comprising the following steps:

providing a main alloy casting piece comprising, by mass percentage, 28.5% to 29% of M, 1% to 2% of Co, 0.2% to 0.5% of Ga, 0.05% to 0.15% of Al, 0.9% to 0.92% of B, 0.05% to 0.15% of Ti, and a balance of Fe, wherein the M comprises Pr and Nd; and subjecting the main alloy casting piece and an auxiliary alloy casting piece to a double-alloy hydrogen decrepitation, a jet milling, an orientation molding, a sintering, and a tempering in sequence, to obtain the NdFeB permanent magnet;

wherein the auxiliary alloy casting piece is prepared by a process comprising the following steps:

providing an auxiliary alloy material comprising, by mass percentage, 40% to 45% of Pr, 1% to 2% of Co, 0.5% to 1% of Ga, 0.6% to 0.8% of B, 0.1% to 0.2% of V, 0.3% to 0.7% of Ti, and a balance of Fe;

smelting the auxiliary alloy material to obtain a smelted material; and subjecting the smelted material to a rapid-setting casting to obtain the auxiliary alloy casting piece;

wherein the rapid-setting casting comprises a refining, a casting and a cooling in sequence; the casting is conducted at a casting temperature of 1,330° C. to 1,380° C. at a copper roller rotational speed of 60 rpm to 80 rpm; and the cooling is conducted by argon-filled air cooling at a cooling rate of 7° C./min to 15° C./min; and the auxiliary alloy casting piece has a microstructure with spherical features having a diameter of 3 μm to 15 μm, wherein the orientation molding is conducted at a magnetic induction intensity of 1.8 T to 2.3 T and a molding pressure of 3 MPa to 6 MPa to obtain a green body; and the green body obtained by the orientation molding has a density of 4.1 g/cm$^3$ to 4.3 g/cm$^3$.

2. The method of claim 1, wherein the auxiliary alloy casting piece has a mass of 10% to 15% of the main alloy casting piece;

the double-alloy hydrogen decrepitation comprises a hydrogen absorption, a first dehydrogenation, and a second dehydrogenation in sequence;

the hydrogen absorption is conducted at a temperature of 330° C. to 360° C. for 45 min to 60 min;

the first dehydrogenation is conducted at a temperature of 435° C. to 465° C. for 2 h to 3 h; and the second dehydrogenation is conducted at a temperature of 570° C. to 590° C. for 6 h to 8 h.

3. The method of claim 1, wherein the jet milling is conducted in the presence of a lubricant, and the lubricant has a mass of 1.5%% to 2% of a powder obtained by the hydrogen decrepitation;

the jet mill is conducted at a pressure of 5.9 MPa to 6.1 MPa with a powder output speed of 130 kg/h to 160 kg/h; and a fine powder obtained by the jet milling has a d50 of 2.5 μm to 3 μm and a particle size distribution d90/d10 of 3.47 to 3.8.

4. A method for preparing an NdFeB permanent magnet, comprising the following steps:

providing a main alloy casting piece comprising, by mass percentage, 28.5% to 29% of M, 1% to 2% of Co, 0.2% to 0.5% of Ga, 0.05% to 0.15% of Al, 0.9% to 0.92% of B, 0.05% to 0.15% of Ti, and a balance of Fe, wherein the M comprises Pr and Nd; and subjecting the main alloy casting piece and an auxiliary alloy casting piece to a double-alloy hydrogen decrepitation, a jet milling, an orientation molding, a sintering, and a tempering in sequence, to obtain the NdFeB permanent magnet;

wherein the auxiliary alloy casting piece is prepared by a process comprising the following steps:

providing an auxiliary alloy material comprising, by mass percentage, 40% to 45% of Pr, 1% to 2% of Co, 0.5% to 1% of Ga, 0.6% to 0.8% of B, 0.1% to 0.2% of V, 0.3% to 0.7% of Ti, and a balance of Fe;

smelting the auxiliary alloy material to obtain a smelted material; and subjecting the smelted material to a rapid-setting casting to obtain the auxiliary alloy casting piece;

wherein the rapid-setting casting comprises a refining, a casting and a cooling in sequence; the casting is conducted at a casting temperature of 1,330° C. to 1,380° C. at a copper roller rotational speed of 60 rpm to 80 rpm; and the cooling is conducted by argon-filled air cooling at a cooling rate of 7° C./min to 15° C./min; and the auxiliary alloy casting piece has a microstructure with spherical features having a diameter of 3 μm to 15 μm;

wherein the sintering comprises a first sintering and a second sintering in sequence; the first sintering is conducted at a vacuum degree of less than $5\times10^{-2}$ Pa and a temperature of 1,020° C. to 1,050° C. for 2 h to 4 h; and the second sintering is conducted at a vacuum degree of less than $5\times10^{-2}$ Pa and a temperature of 1,060° C. to 1,080° C. for 8 h to 10 h; and the tempering comprises a first tempering and a second tempering in sequence; the first tempering is conducted at a vacuum degree of less than 5 Pa and a temperature of 890° C. to 920° C. for 3 h to 5 h; and the second tempering is conducted at a vacuum degree of less than 8 Pa and a temperature of 490° C. to 520° C. for 5 h to 7 h.

5. The method of claim 4, wherein the auxiliary alloy casting piece has a mass of 10% to 15% of the main alloy casting piece;

the double-alloy hydrogen decrepitation comprises a hydrogen absorption, a first dehydrogenation, and a second dehydrogenation in sequence;

the hydrogen absorption is conducted at a temperature of 330° C. to 360° C. for 45 min to 60 min;

the first dehydrogenation is conducted at a temperature of 435° C. to 465° C. for 2 h to 3 h; and the second dehydrogenation is conducted at a temperature of 570° C. to 590° C. for 6 h to 8 h.

6. The method of claim 4, wherein the jet milling is conducted in the presence of a lubricant, and the lubricant has a mass of 1.5%% to 2%% of a powder obtained by the hydrogen decrepitation;

the jet mill is conducted at a pressure of 5.9 MPa to 6.1 MPa with a powder output speed of 130 kg/h to 160 kg/h; and a fine powder obtained by the jet milling has a d50 of 2.5 μm to 3 μm and a particle size distribution d90/d10 of 3.47 to 3.8.

* * * * *